United States Patent [19]

Hancu

[11] 4,094,038

[45] June 13, 1978

[54] WINDSCREEN WIPERS FOR AUTOMOBILE VEHICLES

[75] Inventor: Theodore Hancu, Geneva, Switzerland

[73] Assignee: Societe d'Exploitation de Brevets J.B., Fribourg, Switzerland

[21] Appl. No.: 746,962

[22] Filed: Dec. 2, 1976

[30] Foreign Application Priority Data

Jan. 27, 1976 Switzerland .............................. 975/76

[51] Int. Cl.² ............................................... B60S 1/40
[52] U.S. Cl. ................................... 15/250.32; 403/386
[58] Field of Search ........... 15/250.31, 250.32, 250.35, 15/250.36; 403/386

[56] References Cited

U.S. PATENT DOCUMENTS

| | | | |
|---|---|---|---|
| 3,845,519 | 11/1974 | Quinlan et al. | 15/250.32 |
| 3,866,259 | 2/1975 | Nichols et al. | 15/250.32 |

*Primary Examiner*—Edward L. Roberts
*Attorney, Agent, or Firm*—Nolte and Nolte

[57] ABSTRACT

Windscreen wiper of the type comprising a pivotal arm and a blade detachably mounted on the free end of the arm, a pin integral with the arm or with the blade and journalled in a bore formed in the other part, that is, the blade or the arm respectively. The blade comprises a hook member which laterally projects with respect to the blade and is adapted to cooperate with the arm in the operating position.

7 Claims, 8 Drawing Figures

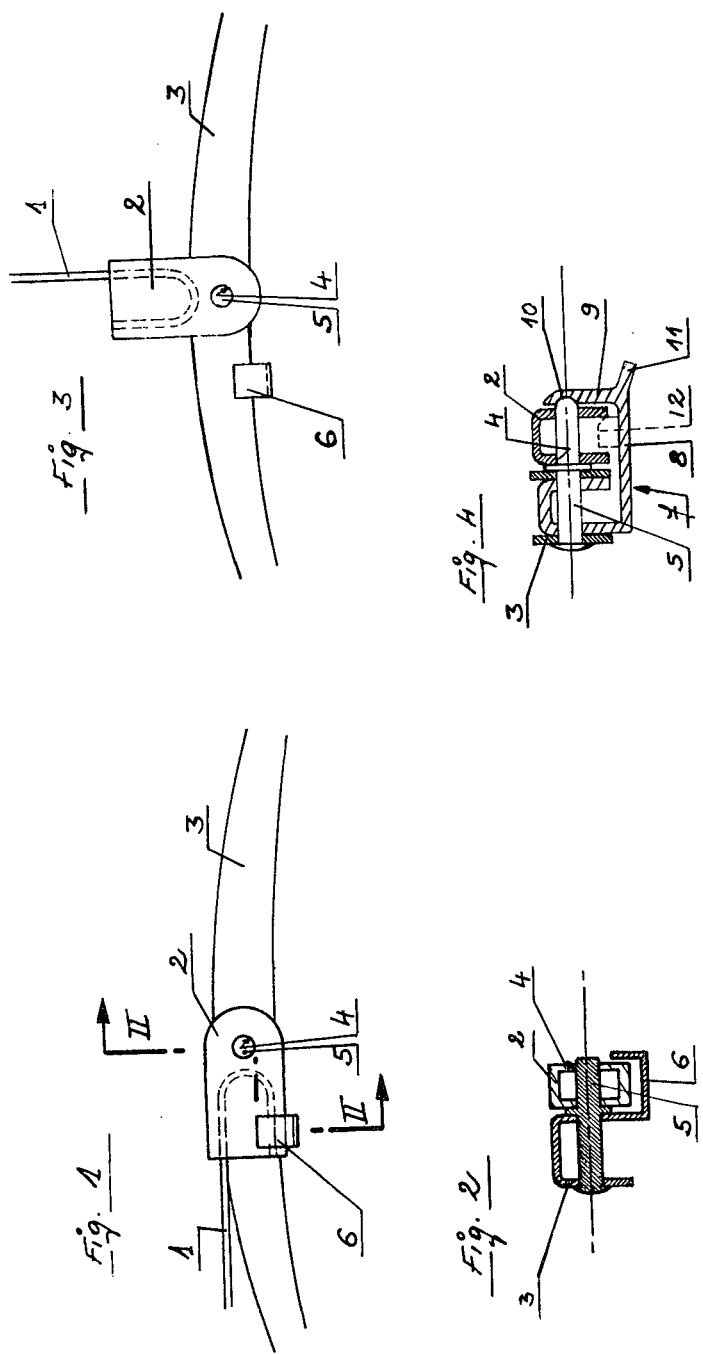

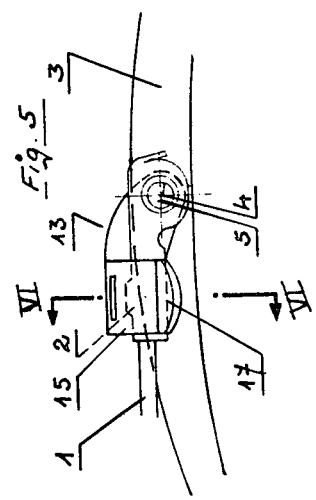
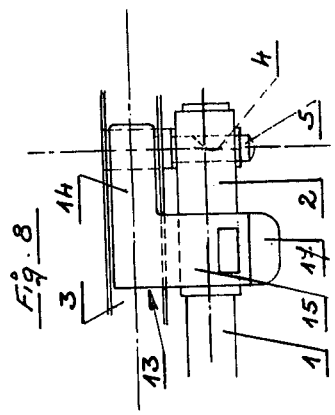
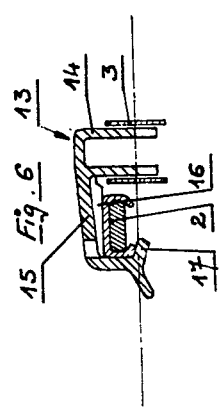
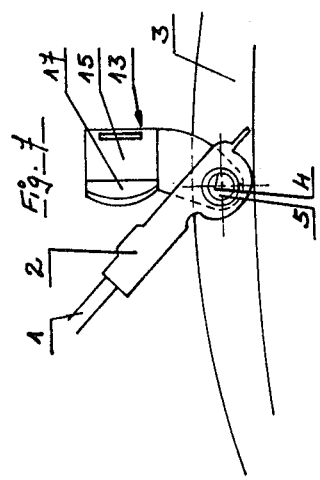

WINDSCREEN WIPERS FOR AUTOMOBILE VEHICLES

The present invention relates to improvements in windscreen wipers for automobile vehicles and more particularly to windscreen wipers comprising a pivotal arm on which a detachable blade is mounted.

Such windscreen wipers are known in which a transverse pin integral with the end of the arm, or with the middle portion of the blade, is journalled in a bore formed in the other part, that is, the blade or the arm respectively. In order to permit the removal and exchange of the blade, various means have been proposed for locking the pin and precluding its accidental extraction from the bore. These known devices have the drawback of being expensive and adaptable only to a given pin.

An object of the invention is to avoid these drawbacks of known windscreen wipers.

This result is obtained in accordance with the invention with a windscreen wiper of the type comprising a pivotal arm and a blade detachably mounted on the free end of the arm, a pin integral with the arm or the blade and journalled in a bore formed in the other part, that is, the blade or the arm respectively, wherein the blade comprises a lateral hook member adapted to cooperate with the arm in the operating position.

In the conventional manner, the blade is mounted on the arm to be substantially perpendicular thereto. When the blade is pivoted to bring it to a position in which it is parallel to the arm, the lateral hook member of the blade surrounds the arm. When the arm and the blade are folded onto the surface to be wiped, the blade remains connected to the arm in the course of the pivoting of the arm while being pivotable with respect to the latter.

Such a windscreen wiper has been shown in the accompanying drawings by way of an example to which the invention is not intended to be limited. In these drawings:

FIG. 1 is an elevational view of a part of a windscreen wiper in the operating position;

FIG. 2 is a sectional view taken on line II—II of FIG. 1;

FIG. 3 is similar to FIG. 1, the windscreen wiper being in the assembling position;

FIG. 4 is a diagrammatic sectional view, taken on the pivot axis, of a blade and a windscreen wiper arm according to a modification of the invention;

FIG. 5 is similar to FIG. 1 in respect to another modification;

FIG. 6 is a sectional view taken on line VI—VI of FIG. 5;

FIG. 7 is similar to FIG. 5 in respect of another position, and

FIG. 8 is a plan view of the design of the windscreen wiper shown in FIGS. 5 to 7.

With reference first to FIGS. 1 to 3, the windscreen wiper comprises an arm 1 one end of which (not shown) is secured to a pivot capable of undergoing an alternating pivotal movement. Mounted on the free end 2 of the arm 1 is a windscreen wiper blade 3 only a part of which has been shown.

In the described embodiment, the end 2 of the arm 1 is provided with a transverse bore 4 and the blade 3 has in the middle thereof a pin 5 which extends transversely from the blade and is adapted to be journalled in the bore 4. When the arm is made with a transverse pin, it will be understood that it is the blade which has a transverse bore.

The blade 3 comprises, offset from the pin 5, a hook member 6 which laterally projects from the same side of the blade as the pin 5. In the operating position (FIGS. 1 and 2), the hook member 6 partly surrounds the end 2 of the arm 1 and the blade 3 remains connected to the arm 1, the end portion of the hook engaging the face of the arm opposed to the hook. On the other hand, when the arm 1 has been raised and the blade 3 is no longer parallel thereto, the hook member 6 is moved away from the end 2 of the arm 1 and the blade 3 can be removed from the arm for replacement purposes.

In the embodiment shown in FIG. 4, the blade 3 is also provided with a pin 5; which is journalled in a bore 4 in the end 2 of the arm. A hook member 7 is integral with the blade 3 in the region of the pin 5 and includes a lateral arm 8 which extends beyond the blade 3 and is elastically deformable and terminates in a shoulder or end portion 9, the dimensions being such that the shoulder 9 bears elastically against the projecting end 10 of the pin 5 and surrounds the arm 2. A tab 11 may be provided for shifting the hook member 7. By way of a modification or as a complement, the arm 8 of the hook member may carry a projection or projecting portion 12 which is adapted to enter the interior of the arm 2 and lock the latter laterally with respect to the blade. This embodiment enables the blade to be mounted to the left or the right of the arm, as required.

With reference now to FIGS. 5 to 8 which show another modification of the windscreen wiper according to the invention, the lateral hook member 13 is mounted to be pivotable about the pin 5 and includes an arm 14 perpendicular to the pin 5 and extended by a lateral arm 15. The arm 15 has an inner cavity 16 adapted to match the shape of the free end 2 of the arm 1 and terminates in an elastic tab 17 which locks under the end 2 so as to prevent the lateral displacement of the blade 3 with respect to the arm 1.

What is claimed is:

1. A windscreen wiper of the type comprising a pivotal arm and a blade detachably mounted on the free end of the arm, a pin secured to one of said arm and blade and journalled in a bore formed in the other of said arm and blade, said blade comprising a hook member which laterally projects with respect to the blade and is adapted to cooperate with the arm in the operating position to hold said pin in said bore.

2. A windscreen wiper as claimed in claim 1, wherein said hook member is longitudinally offset with respect to the pivot pin of the blade and is integral with said arm.

3. A windscreen wiper as claimed in claim 1, wherein said hook member is contained in a plane containing the pivot pin of the blade and perpendicular to the blade and is elastically deformable in a direction perpendicular to said pin.

4. A windscreen wiper as claimed in claim 3, wherein an end portion of said hook member bears on the face of the arm opposed to said blade.

5. A windscreen wiper as claimed in claim 3, wherein said arm includes a generally U-shaped section and a projecting portion of said hook member is disposed within said U-shaped section.

6. A windscreen wiper as claimed in claim 1, wherein said hook member is longitudinally offset with respect to the pivot pin of the blade and is pivotable about said pin.

7. A windscreen wiper as claimed in claim 6, wherein said hook member includes an elastic locking tab which is cooperative with said arm.

* * * * *